US007512228B2

(12) United States Patent  (10) Patent No.: US 7,512,228 B2
Kortum et al.  (45) Date of Patent: Mar. 31, 2009

(54) SYSTEM AND METHOD FOR OPERATING A TELEPHONE TO BYPASS A WIRELINE TELEPHONE SERVICE

(75) Inventors: Philip Ted Kortum, Austin, TX (US); Marc Andrew Sullivan, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 211 days.

(21) Appl. No.: 10/771,127

(22) Filed: Feb. 3, 2004

(65) Prior Publication Data

US 2005/0180560 A1 Aug. 18, 2005

(51) Int. Cl.
*H04M 1/00* (2006.01)
(52) U.S. Cl. .............................. 379/413.03; 455/554.2
(58) Field of Classification Search .............. 455/426.1, 455/426.2, 413.03, 554.2
See application file for complete search history.

(56) References Cited

U.S. PATENT DOCUMENTS

| 5,528,676 | A | * | 6/1996 | Sussell et al. ............... 379/111 |
| 5,978,684 | A | * | 11/1999 | Cook et al. ................. 455/462 |
| 6,229,890 | B1 | * | 5/2001 | Kerr et al. .............. 379/413.02 |
| 6,411,802 | B1 | * | 6/2002 | Cardina et al. .............. 455/424 |
| 6,741,835 | B2 | * | 5/2004 | Pulver ........................ 455/3.05 |
| 6,812,396 | B2 | * | 11/2004 | Makita et al. ................ 136/244 |
| 2003/0101373 | A1 | * | 5/2003 | Freyman et al. ................ 714/14 |

* cited by examiner

*Primary Examiner*—Walter F Briney, III
(74) *Attorney, Agent, or Firm*—Toler Law Group

(57) ABSTRACT

A system and method are disclosed for operating a telephone to bypass wireline telephone service. A system that incorporates teachings of the present disclosure may include, for example, a housing component at least partially defining a first and a second enclosure. The housing component may be part of a Local Exchange Carrier Network Interface Device. In such an embodiment, the first enclosure may represent a service provider access portion, and the second enclosure may represent a customer access portion. The system may also include a door coupled to the housing component. The door may be capable of being releasably secured in a closed position such that the door defines a portion of the first enclosure. A cradle system formed to receive a wireless transceiving device may be secured within the first enclosure in a manner allowing the door to be releasably secured in the closed position. In some embodiments, the system may also have a local power supply associated with the cradle system and electrically coupled to a premises wiring connection point. The local power supply may be able to provide a ring voltage to the premises wiring connection point and to power a cradled wireless transceiver.

22 Claims, 2 Drawing Sheets

SYSTEM AND METHOD FOR OPERATING A TELEPHONE TO BYPASS A WIRELINE TELEPHONE SERVICE

FIELD OF THE INVENTION

The present disclosure relates generally to telecommunication services, and more specifically to a system and method for operating a telephone to bypass a wireline telephone service.

BACKGROUND

Most telephone service subscribers recognize that a ringing telephone indicates an incoming telephone call. In many cases, the telephone station rings in response to the receipt of a ring signal. For example, a telephone company providing Plain Old Telephony Service (POTS) may receive a call for a given subscriber and may initiate the sending of a ring signal from a central office to the home of that subscriber. A common technique involves feeding a 75 Volt, 20 Hz Alternating Current ringing current down one wire of a twisted pair telephone line. The power supporting these signals comes from a large amount of batteries located in a central office of the service provider.

In addition, a service provider often relies on central office power to detect an off-hook condition at a customer premises. The off-hook condition will typically complete a circuit and "tell" a switch in the central office to send a dial tone to the premises. As mentioned above, the ring voltage and dial tone typically originate at the central office of a service provider. These signals in combination with the in-wall wiring of a subscriber's home facilitate wireline telephone services. A subscriber simply plugs a telephone station into an RJ-11 jack—connecting the telephone station to the in-wall wiring—and the subscriber can make and receive wireline telephone calls.

While this conventional version of wireline telephone service represents a nice option for some subscribers, these services have several shortcomings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Embodiments discussed below describe, in part, processes and devices that allow a user to make and receive telephone calls from a premises connected telephone station in a manner that bypasses wireline telephone services. From a high level, a system incorporating teachings of the present disclosure may effectively allow a user to transparently make wireless calls from a telephone connected to a premises wiring system.

In some embodiments, such a system may include a housing component at least partially defining a first and a second enclosure. The housing component may be part of a Local Exchange Carrier Network Interface Device. In such an embodiment, the first enclosure may represent a service provider access portion, and the second enclosure may represent a customer access portion. The system may also include a door coupled to the housing component. The door may be capable of being releasably secured in a closed position such that the door defines a portion of the first enclosure. A cradle system formed to receive a wireless transceiving device may be secured within the first enclosure in a manner allowing the door to be releasably secured in the closed position.

In some embodiments, the system may also have a local power supply associated with the cradle system and electrically coupled to a premises wiring connection point. The local power supply may be able to provide a ring voltage to the premises wiring connection point and to power a cradled wireless transceiver.

Figure 1:
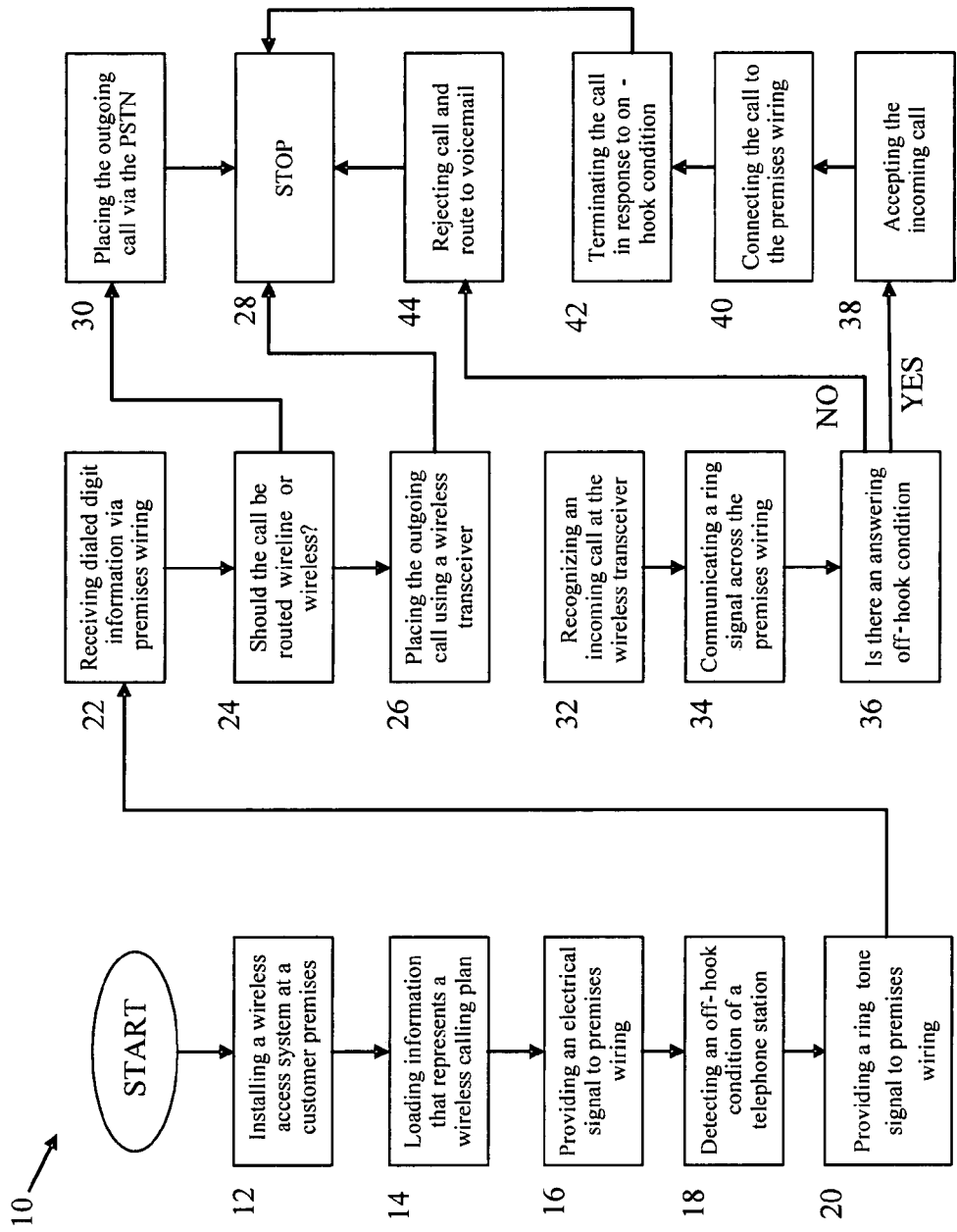
FIG. 1 presents a flow diagram for a technique of operating a telephone station at a premises that incorporates teachings of the present disclosure.

As mentioned above, FIG. 1 presents a flow diagram for a technique 10 of operating a telephone station at a premises that incorporates teachings of the present disclosure. At step 12, a service provider may recognize that a user would like to make use of a system like the one depicted in FIG. 2. The service provider, the user, and/or some other individual or entity may install a wireless access system at the customer premises. In some embodiments, the wireless access system may be retrofitted into an existing Local Exchange Carrier (LEC) Network Interface Device (NID). As such, preferred embodiments of a wireless access system may have a form factor to allow for easy installation into a standard NID configuration.

At step 14, information representing a wireless calling plan, a wireline calling plan, and/or some other backhaul related information may be loaded into a memory associated with or accessible by the installed wireless access system. In some systems, a user may elect to terminate an existing connection to a Public Switched Telephone Network (PSTN). In many instances, the PSTN may have been providing line power to the customer premises wiring—allowing installed customer premises telephones to ring in response to incoming calls, to output dial tones, and to otherwise operate in a normal manner, even in circumstances where power company provided power to the premises has been lost.

As such, step 16 may include providing a local source of power to facilitate operation of premises wiring connected devices. At step 18, an off-hook condition may be detected. For example, a user may have lifted a handset of a premises telephone station in order to make a telephone call, data call, facsimile call, and/or other outgoing communication. At step 20, a dial tone signal may be communicated across the premises wiring. The dial tone signal may, for example, allow a telephone station speaker assembly to output a combination tone including a 350-hertz tone and a 440-hertz tone.

At step 22, dialed digit information may be received in connection with a desired outgoing call. The dialed digit information may be received, for example, at the wireless access system via the premises wiring. At step 24, the decision of how to route the call may be determined. The call may be routed as a wireless call, a wireline call, a Voice over Internet Protocol (VoIP) call, a digital call sent within a derived voice channel, and/or by some other technique. In some embodiments, the decision of how to route the call may include consideration of the loaded calling plan information.

A user may have a wireless calling plan that allows for five thousand minutes a month of weekend or evening calls, and the user may have only consumed two hundred of those minutes. The user may also have a wireline long distance plan that allows the user to make long distance calls for five cents a minute. If the dialed digit information indicates that an outgoing call is a long distance call, and the call is being placed during a weekend and/or evening period, logic associated with the wireless access system may elect to route the call as a wireless call—potentially saving the user some amount of money.

However the step 24 decision is made, if the call is to be routed as a wireless call, technique 10 may progress to step 26. At step 26, the outgoing call may be routed to a wireless network for call completion, and technique 10 may progress to stop at step 28. Similarly, if the call is to be routed as a wireline call, technique 10 may progress to step 30. At step 30, the outgoing call may be routed to a wireline network like the PSTN or a cable network for call completion, and technique 10 may progress to stop at step 28.

Technique 10 may also allow for the receipt of incoming wireless calls. In operation, a wireless transceiver associated with the wireless access system may be "listening" for incoming calls and detect one at step 32. In response, a ring signal may be communicated across the premises wiring system at step 34. It may be determined at step 36 whether or not an answering off-hook condition has been recognized. If a premises telephone station has gone off-hook in a presumed effort to answer the call, technique 10 may progress to step 38, at which point the wireless transceiver may "answer" the call. The answered call may then be connected to the premises wiring at step 40 to allow the user to utilize a premises connected telephone station to engage in a wireless call.

The user may hang-up the phone to terminate the call, and this activity may be recognized by the wireless access system at step 42, where the call connection may be terminated. Technique 10 may then progress to stop at step 28.

If at step 36 it was determined that the incoming call would not be answered, the wireless access system may have rejected and/or failed to accept the call at step 44—causing the caller to continue hearing a ring, to be played a message indicting that the called party has not answered, and/or to be routed to a voice mail box. Technique 10 may then progress to stop at step 28.

In practice, a system employing a technique like technique 10 may operate at a local server, logic, or other computing platform that executes instructions that effectuate the technique. In such a system, the computing platform, whatever its form, may include a computer-readable medium containing computer-readable instructions capable of instructing the platform to provide an electrical signal to a premises connected telephone station from a local power supply. The electrical signal may facilitate detection of an off-hook condition at the telephone station. The computer-readable medium may include additional instructions directing the platform to recognize an off-hook condition and to output a dial tone to the telephone station. The platform may then be instructed to receive a dialed digit from the telephone station and to determine how to route the outgoing call associated with the dialed digit. The platform may also have access to a stored wireless calling plan and may be instructed to consider the plan when determining how to route the outgoing call.

Figure 2:
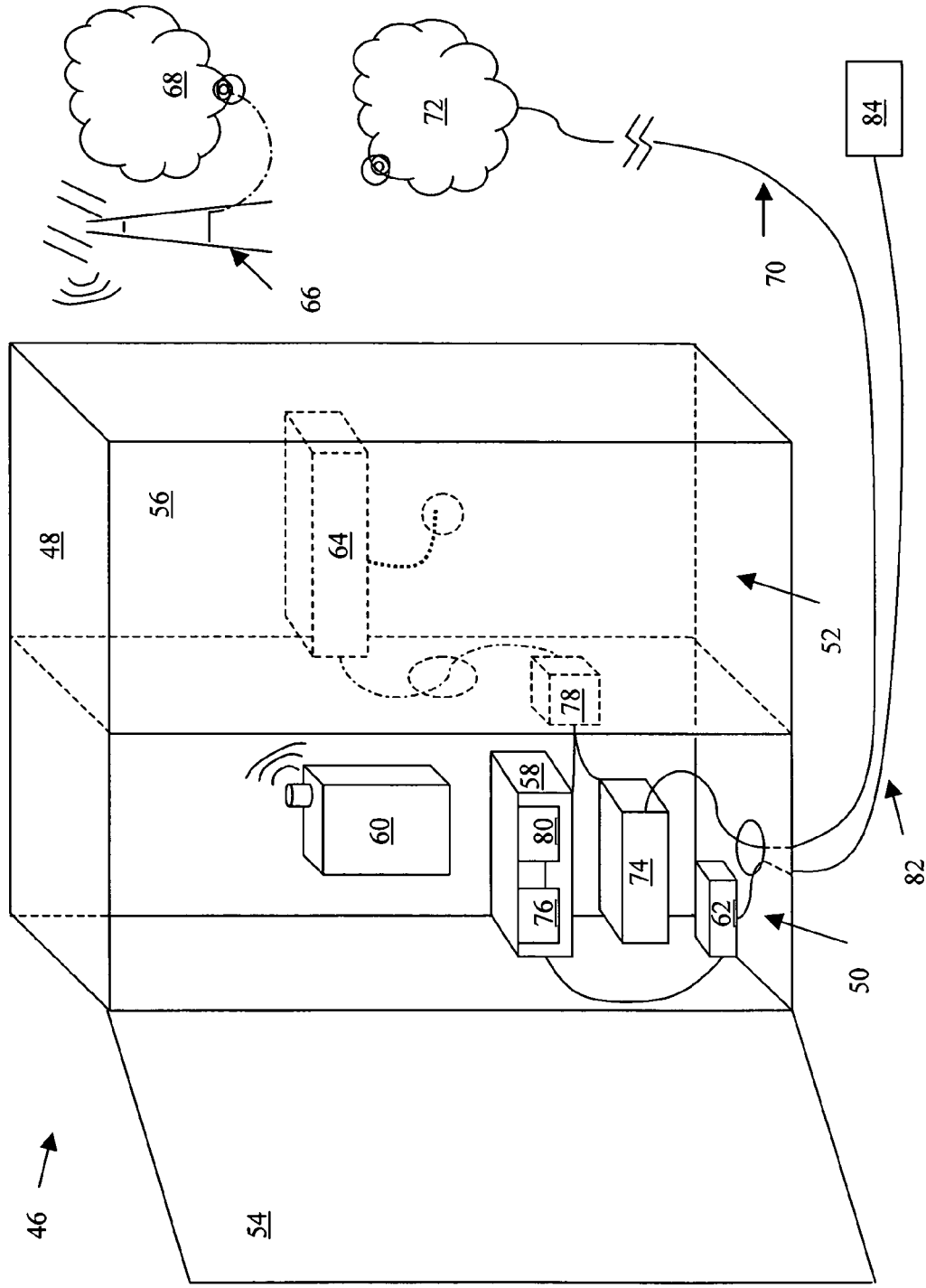
FIG. 2 shows one embodiment of a system for bypassing a wireless service in accordance with teachings disclosed herein.

FIG. 2 shows one embodiment of a system 46 for bypassing a wireless service in accordance with teachings disclosed herein. As depicted, system 46 may include a housing component 48 that at least partially defines a first enclosure 50 and a second enclosure 52. In some embodiments, enclosures 50 and 52 may be part of a LEC NID. One of the enclosures may, for example, be reserved for service provider access, and the other may allow for customer access.

As depicted, system 46 may also include a first door 54 that may be coupled to a housing component and may be capable of being releasably secured in a closed position such that door 54 defines a portion of first enclosure 50. Similarly, system 46 may also include a second door 56 that may be coupled to a housing component and may be capable of being releasably secured in a closed position (as shown) such that door 56 defines a portion of second enclosure 52.

Within enclosure 50 may be located a cradle system 58 formed to receive a wireless transceiving device 60. In some embodiments, enclosure 50 may represent the enclosure reserved for service provider access and may include a locking mechanism for securing door 54 in a closed position. Placing cradle system 58 and wireless transceiver 60 within a lockable enclosure reserved for service provider access may help protect these communication assets against theft, vandalism, and/or other potentially damaging activity. To facilitate this objective, cradle system 58 may be secured within first enclosure 50 in a manner allowing door 54 to be releasably secured in the closed position.

Depending on implementation details, some users may elect to terminate wireline service and, as such, lose the benefits of line power provided by many LECs. To help combat this challenge, a local power supply 62 may be included and associated with cradle system 58. Local power supply 62 may also be electrically coupled to a premises wiring connection point 64 to facilitate supplying power to provide things like a ring voltage and a dial tone to the premises wiring.

As mentioned above, system 46 may include a wireless transceiving device like device 60. In some embodiments, device 60 may be capable of communicating in one or more wireless modes. For example, device 60 may be able to communicate in a cellular mode, a fixed wireless mode, an ultra-wideband mode, a local area wireless mode, and a satellite mode. The cellular mode (as depicted) may include communicating with a cellular network node 66 of a larger cellular network 68 using voice-related cellular technologies and/or data-related technologies like GPRS, EDGE, and others. A fixed wireless mode may involve fixed wireless operators in the multichannel multipoint distribution system (MMDS) band and/or the local multipoint distribution system (LMDS) band. And, a local area wireless mode may involve technologies like Bluetooth and 802.11(x) technologies.

In some cases, a user may elect to maintain a wireline link 70 at the premises interconnecting a wireline network 72 to a premises NID block 74. The wireline network may be, for example, a Public Switched Telephone Network, a cable network, and/or some other network capable of facilitating communication. Depending on the network type, link 70 may be made up of different materials like twisted pair wiring, coaxial cable, fiber, and/or some other physical medium.

In an embodiment including more than one backhaul option, system 46 may also include logic 76 operable to determine how an outbound call should be routed. A switch 78 may be responsive to logic 76 and may be capable of routing the outbound call to link 70 in response to a wireline route signal. Switch 78 may also be capable of routing the outbound call to wireless transceiver 60 in response to a wireless route signal. If additional and/or other backhaul options are made available, switch 78 may be designed to allow outbound calls to be routed across two, three, four, or more available paths.

Depending, in part, on implementation detail, system 46 may also have a memory 80 communicatively coupled to logic 76. Memory 80 may store, for example, wireless calling plan information for a user, and logic 76 may be able to consider the wireless calling plan information in connection with making a call routing determination. Logic 76 may have other capabilities in addition to the ones discussed above. For example, logic 76 may operate as a dial tone mechanism capable of detecting an off-hook condition of a telephone station communicatively coupled to a premises wiring system. The dial tone functionality may also include the ability to initiate interconnection of local power supply 62 to a wire included in the premises wiring system.

As indicated above, local power supply 62 may facilitate detection of off-hook conditions, generate dial tones, provide ring voltages, power switch 78, and support the communication efforts of wireless transceiver 60. As such, local power supply 62 may be designed to include a rechargeable battery. In some embodiments, power supply 62 may be connected to a power line 82 capable of providing at least a trickle charge for recharging power supply 62. As depicted, power line 82 may be connected to a power source 84, which may include, for example, a solar cell. The solar cell could be local to the premises or remote. The power source may also be a power generation facility associated with an electric company. In such an embodiment, power line 82 may include or be connected to some premises electrical wiring.

In various embodiments, the telephones, computers, logic, mechanisms, switches, devices, servers, and/or platforms, described above, may take forms or be embodied in devices including wireless and cordless phones, personal digital assistants, cellular telephones, mobile telephones, laptop computers, desktop computers, mainframes, PSTN switches, Ethernet switches, routers, gateways, hardware, firmware, software, work stations, other options having some level of computing capability, and/or a combination thereof.

The methods and systems described herein provide for an adaptable implementation. Although certain embodiments have been described using specific examples, it will be apparent to those skilled in the art that the invention is not limited to these few examples. For example, the embodiments described above may focus on a retro-fit solution designed for installation in and/or implementation by deployed equipment. Other non-retro-fit options could be employed to instantiate the teachings disclosed herein. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A system to bypass a wireline telephone service, the system comprising:
    a housing component at least partially defining a first and a second enclosure, the first enclosure including a wireless device within the first enclosure and a first door coupled to the housing and having a locking mechanism to secure the first door in a closed position to restrict access to the first enclosure, the first enclosure accessible to a service provider, the second enclosure including a second door coupled to the housing, the second enclosure accessible to a subscriber;
    the wireless device to communicate with a wireless network via one or more wireless modes;
    a network interface device within the first enclosure to communicate with a public telephone network;
    a switch to couple the wireless device and the network interface device to premises wiring;
    a local power supply to supply a ring voltage to the premises wiring when a call is received via the wireless device, wherein the local power supply comprises a rechargeable battery;
    a memory to store a wireless calling plan and a wireline calling plan associated with the subscriber; and
    logic within the first enclosure, the logic to control the switch to selectively route calls from the premises wiring either to the wireless device or to the network interface device based on the wireless calling plan and the wireline calling plan.

2. The system of claim 1, wherein the one or more wireless modes comprises a cellular mode to communicate with a cellular node of a cellular network using data-related technologies including general packet radio service (GPRS) technology and Enhanced Data rates for Global Evolution (EDGE) technology, or any combination thereof.

3. The system of claim 1, wherein the one or more wireless modes comprises a fixed wireless mode including fixed wireless operators in a multichannel multipoint distribution system (MMDS) band, in a local multipoint distribution system (LMDS) band, or any combination thereof.

4. The system of claim 1, wherein the one or more wireless modes comprises an ultrawideband mode.

5. The system of claim 1, wherein the one or more wireless modes comprises a satellite mode.

6. The system of claim 1, wherein the one or more wireless modes comprises a local area wireless mode.

7. The system of claim 1, further comprising a solar cell coupled to the local power supply, wherein the rechargeable battery derives the charge voltage from the solar cell.

8. The system of claim 1, wherein the logic is adapted to detect an off-hook condition of a telephone device coupled to the premises wiring.

9. A method of providing telephone service at a premises, the method comprising:
    detecting an off-hook condition of a telephone station coupled to premises wiring at a premises using logic positioned within a locked portion of a housing having a locked portion and an unlocked portion and situated at the premises, the locked portion including the logic, a local power supply, a wireless device, a network interface device, and a memory including stored wireless and wireline calling plan information, the locked portion restricting access to the wireless device by a subscriber;
    providing an electrical signal to the telephone station in response to detecting the off-hook condition, the electrical signal to provide a dial tone to the telephone station;
    receiving a signal related to dialed numbers of an outgoing call from the telephone station;
    accessing the calling plan information using the logic; and
    activating a switch to selectively route the outgoing call based on the wireless and wireline calling plan information to the wireless device for connection via a wireless network or to the network interface device for connection via a public telephone network.

10. The method of claim 9, wherein the local power supply comprises a rechargeable battery.

11. The method of claim 10, wherein the local power supply further comprises a power cell local to the premises to provide power to recharge the battery.

12. The method of claim 9, wherein the locked portion of the housing is accessible to a service provider.

13. The method of claim 9, further comprising:
receiving an incoming call from a wireless network via the wireless device; and
providing a ring signal to the premises wiring to cause the telephone station to ring.

14. The method of claim 13, further comprising:
detecting an answering off-hook condition related to the telephone station; and
routing the incoming call to the telephone station in response to detection of the answering off-hook condition.

15. The method of claim 13, further comprising:
detecting no off-hook condition related to the telephone device during an answer time period; and
routing the incoming call to a voicemail.

16. The method of claim 9, further comprising:
receiving an incoming call from a wireless network via the wireless device;
detecting an existing off-hook condition associated with the telephone device via the logic; and
routing the incoming call to voicemail in response to detection of the existing off-hook condition.

17. A system to provide telephone service, the system comprising:
a housing component at least partially defining a first and a second enclosure;
a first door coupled to the housing component, the first door including a locking mechanism to secure the first door in a closed position relative to the housing component to define the first enclosure, the first enclosure accessible to a service provider;
a second door coupled to the housing component and operable to be releasably secured in a closed position relative to the housing component to define the second enclosure, the second enclosure accessible to a subscriber;
a wireless transceiving device within the first enclosure, the wireless transceiving device adapted to communicate with a wireless network via one or more wireless modes;
a premises wiring connection point within the second enclosure coupled to a telephone station via premises wiring;
a switch within the first enclosure to selectively route calls from the premises wiring either to the wireless transceiving device or to a network interface device, wherein the network interface device is within the first enclosure;
a local power supply within the first enclosure coupled to the premises wiring connection point to provide power to the premises wiring; and
logic within the first enclosure to control the switch to selectively route calls from the premises wiring either to the wireless transceiving device or to the network interface device based on a wireless calling plan and a wireline calling plan.

18. The system of claim 17, further comprising a memory accessible to the logic to store information related to the wireless calling plan associated with a subscriber.

19. The system of claim 17, wherein the local power supply comprises a rechargeable battery.

20. The system of claim 19, wherein the local power supply further comprises a solar cell to provide a charge to the rechargeable battery.

21. The system of claim 17, wherein the first enclosure and the second enclosure are of approximately equal size.

22. The system of claim 17, further comprising a communication device comprising the wireless transceiving device, the switch, the local power supply and the logic, the communication device adapted for retrofit installation within the first enclosure.

* * * * *